US011499986B2

(12) United States Patent
Tomescu

(10) Patent No.: US 11,499,986 B2
(45) Date of Patent: *Nov. 15, 2022

(54) FEEDBACK DEVICE WITH VARIABLE MAGNETIC PERMEABILITY

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 196 days.

This patent is subject to a terminal disclaimer.

(21) Appl. No.: 16/702,465

(22) Filed: Dec. 3, 2019

(65) Prior Publication Data

US 2021/0070434 A1 Mar. 11, 2021

Related U.S. Application Data

(60) Provisional application No. 62/896,157, filed on Sep. 5, 2019, provisional application No. 62/896,163, filed on Sep. 5, 2019.

(51) Int. Cl.
*B63H 1/06* (2006.01)
*G01P 3/488* (2006.01)
(Continued)

(52) U.S. Cl.
CPC ............ *G01P 3/488* (2013.01); *B64C 11/301* (2013.01); *B64D 27/10* (2013.01); *F01D 7/00* (2013.01); *F01D 17/02* (2013.01); *F01D 17/06* (2013.01); *F01D 17/20* (2013.01); *F01D 21/003* (2013.01); *F04D 29/362* (2013.01); *G01D 5/145* (2013.01);
(Continued)

(58) Field of Classification Search
CPC ... F03D 1/02; F03D 3/02; B64C 13/16; B64C 11/30
See application file for complete search history.

(56) References Cited

U.S. PATENT DOCUMENTS 4,934,901 A 6/1990 Duchesneau
5,668,471 A 9/1997 Lequesne et al.
(Continued)

FOREIGN PATENT DOCUMENTS

EP 0353076 1/1990
EP 3396304 10/2013
(Continued)

*Primary Examiner* — John Kwon
(74) *Attorney, Agent, or Firm* — Norton Rose Fulbright Canada LLP

(57) ABSTRACT

A system and method for providing feedback for an aircraft-bladed rotor about a longitudinal axis and having an adjustable blade pitch angle. At least one position marker is provided at the rotor, extends along an axial direction, from a first end to a second end, and has varying magnetic permeability from the first end to the second end. At least one sensor is coupled to the rotor and configured for producing, as the rotor rotates about the longitudinal axis, at least one sensor signal in response to detecting passage of the at least one position marker. A control unit is communicatively coupled to the at least one sensor and configured to generate a feedback signal indicative of the blade pitch angle in response to the at least one sensor signal received from the at least one sensor.

12 Claims, 11 Drawing Sheets

(51) Int. Cl.
*B64C 11/30* (2006.01)
*B64D 27/10* (2006.01)
*F01D 7/00* (2006.01)
*F01D 17/20* (2006.01)
*F01D 21/00* (2006.01)
*F01D 17/06* (2006.01)
*G01D 5/14* (2006.01)
*F01D 17/02* (2006.01)
*F04D 29/36* (2006.01)
*F02C 7/32* (2006.01)
*B63H 3/00* (2006.01)
*B64C 11/06* (2006.01)
*F02D 41/28* (2006.01)

(52) U.S. Cl.
CPC ........ *B63H 2003/006* (2013.01); *B64C 11/06* (2013.01); *F02C 7/32* (2013.01); *F02D 2041/281* (2013.01); *F02D 2041/288* (2013.01); *F05B 2270/328* (2013.01); *F05D 2220/323* (2013.01); *F05D 2260/70* (2013.01); *F05D 2270/02* (2013.01); *F05D 2270/80* (2013.01); *F05D 2270/821* (2013.01); *F05D 2300/507* (2013.01)

(56) References Cited

U.S. PATENT DOCUMENTS

| | | |
|---|---|---|
| 5,714,883 A | 2/1998 | Schroeder et al. |
| 5,731,702 A | 3/1998 | Schroeder et al. |
| 5,897,293 A | 4/1999 | Arel et al. |
| 5,913,659 A | 6/1999 | Doolin et al. |
| 6,077,040 A | 6/2000 | Pruden et al. |
| 8,687,206 B2 | 4/2014 | Hockaday |
| 9,821,901 B2 | 11/2017 | Duke et al. |
| 2014/0007591 A1 | 1/2014 | Khibnik et al. |
| 2017/0115320 A1 | 4/2017 | Tuner |
| 2020/0339244 A1* | 10/2020 | Tomescu ................ B64D 31/00 |
| 2021/0061454 A1* | 3/2021 | Tomescu ............... B64C 11/301 |
| 2021/0070426 A1* | 3/2021 | Tomescu ................ B64C 11/30 |
| 2021/0071589 A1* | 3/2021 | Tomescu .................. F02C 9/28 |

FOREIGN PATENT DOCUMENTS

| | | |
|---|---|---|
| EP | 3597532 | 1/2020 |
| EP | 3744630 | 2/2020 |
| FR | 2806129 | 9/2001 |
| GB | 2346701 | 6/2000 |

\* cited by examiner ical Field

FEEDBACK DEVICE WITH VARIABLE MAGNETIC PERMEABILITY

CROSS REFERENCE TO RELATED APPLICATIONS

This patent application claims priority of U.S. provisional Application Ser. No. 62/896,157 and U.S. provisional Application Ser. No. 62/896,163, filed on Sep. 5, 2019, the entire contents of which are hereby incorporated by reference.

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. Prior art feedback devices are suitable for their intended purposes, however, improvements are always desirable, especially in the aerospace industry.

SUMMARY

In accordance with a broad aspect, there is provided a blade angle feedback system for an aircraft-bladed rotor, the rotor rotatable about a longitudinal axis and having an adjustable blade pitch angle. The system comprises at least one position marker provided at the rotor, the at least one position marker extending along an axial direction, from a first end to a second end, and having varying magnetic permeability from the first end to the second end, at least one sensor coupled to the rotor and configured for producing, as the rotor rotates about the longitudinal axis, at least one sensor signal in response to detecting passage of the at least one position marker, and a control unit communicatively coupled to the at least one sensor and configured to generate a feedback signal indicative of the blade pitch angle in response to the at least one sensor signal received from the at least one sensor.

In some embodiments, the at least one position marker is provided on a feedback device coupled to rotate with the rotor and to move along the longitudinal axis with adjustment of the blade pitch angle, and the at least one sensor is positioned adjacent the feedback device and configured for producing, as the feedback device rotates about the longitudinal axis, the at least one sensor signal in response to detecting passage of the at least one position marker.

In some embodiments, the at least one position marker comprises a first material having a first magnetic permeability and defining a first magnetic permeability region, and at least one second material having at least one second magnetic permeability and defining at least one second magnetic permeability region adjacent to the first magnetic permeability region along the axial direction.

In some embodiments, the feedback device comprises a body provided with the at least one position marker, the body made of a third material having a third magnetic permeability substantially equal to or lower than the first magnetic permeability and lower than the at least one second magnetic permeability.

In some embodiments, the at least one second material is a second material having greater magnetic permeability than the first material, and a fine pitch region of the at least one position marker is provided with the first material and a reverse region of the at least one position marker is provided with the second material.

In some embodiments, the at least one second magnetic permeability region comprises a plurality of second magnetic permeability regions axially adjacent to one another along the axial direction and having gradually varying magnetic permeability.

In some embodiments, the first magnetic permeability region is defined at the first end of the at least one position marker, and the at least one second magnetic permeability is greater than the first magnetic permeability and the plurality of second magnetic permeability regions have gradually increasing magnetic permeability from the first end to the second end.

In some embodiments, the first magnetic permeability region is defined at the first end of the at least one position marker, and the at least one second magnetic permeability is lower than the first magnetic permeability and the plurality of second magnetic permeability regions have gradually decreasing magnetic permeability from the first end to the second end.

In some embodiments, the first magnetic permeability region is defined between the first end and the second end of the at least one position marker, and the at least one second magnetic permeability is greater than the first magnetic permeability and the plurality of second magnetic permeability regions have gradually increasing magnetic permeability towards the first end and the second end.

In some embodiments, a height of the at least one position marker varies gradually from the first end to the second end.

In some embodiments, a width of the at least one position marker varies gradually from the first end to the second end.

In some embodiments, the feedback device comprises a body provided with the at least one position marker, the body comprising the first material and the at least one second material, and the first magnetic permeability region and the at least one second magnetic permeability region each comprising a portion of the body and of the at least one position marker.

In some embodiments, the at least one sensor is configured for outputting the sensor signal as a function of a position of the feedback device relative to the longitudinal axis.

In accordance with another broad aspect, there is provided an aircraft-bladed rotor system, comprising a rotor rotatable by a shaft about a longitudinal axis, the rotor having blades with adjustable blade pitch angle, at least one position marker provided at the rotor, the at least one position marker extending along an axial direction, from a first end to a second end, and having varying magnetic permeability from the first end to the second end, and at least one sensor coupled to the rotor and configured for producing, as the rotor rotates about the longitudinal axis, at least one sensor signal in response to detecting passage of the at least one position marker.

In some embodiments, the at least one position marker is provided on a feedback device coupled to rotate with the rotor and to move along the longitudinal axis with adjustment of the blade pitch angle, and the at least one sensor is positioned adjacent the feedback device and configured for producing, as the feedback device rotates about the longitudinal axis, the at least one sensor signal in response to detecting passage of the at least one position marker.

In some embodiments, the at least one position marker comprises a first material having a first magnetic permeability and defining a first magnetic permeability region, and at least one second material having at least one second magnetic permeability and defining at least one second magnetic permeability region adjacent to the first magnetic permeability region along the axial direction.

In some embodiments, the feedback device comprises a body provided with the at least one position marker, the body made of a third material having a third magnetic permeability substantially equal to or lower than the first magnetic permeability and lower than the at least one second magnetic permeability.

In some embodiments, the at least one second material is a second material having greater magnetic permeability than the first material, and a fine pitch region of the at least one position marker is provided with the first material and a reverse region of the at least one position marker is provided with the second material.

In some embodiments, the at least one second magnetic permeability region comprises a plurality of second magnetic permeability regions axially adjacent to one another along the axial direction and having gradually varying magnetic permeability.

In some embodiments, the first magnetic permeability region is defined at the first end of the at least one position marker, and the at least one second magnetic permeability is greater than the first magnetic permeability and the plurality of second magnetic permeability regions have gradually increasing magnetic permeability from the first end to the second end.

In some embodiments, the first magnetic permeability region is defined at the first end of the at least one position marker, and the at least one second magnetic permeability is lower than the first magnetic permeability and the plurality of second magnetic permeability regions have gradually decreasing magnetic permeability from the first end to the second end.

In some embodiments, the first magnetic permeability region is defined between the first end and the second end of the at least one position marker, and the at least one second magnetic permeability is greater than the first magnetic permeability and the plurality of second magnetic permeability regions have gradually increasing magnetic permeability towards the first end and the second end.

In some embodiments, the feedback device comprises a body provided with the at least one position marker, the body comprising the first material and the at least one second material, and the first magnetic permeability region and the at least one second magnetic permeability region each comprising a portion of the body and of the at least one position marker.

In accordance with yet another broad aspect, there is provided a method for providing feedback for an aircraft-bladed rotor, the rotor rotatable about a longitudinal axis and having blades with adjustable blade pitch angle. The method comprises receiving at least one sensor signal from at least one sensor positioned coupled to the rotor, the at least one sensor signal produced by the at least one sensor, as the rotor rotates about the longitudinal axis and in response to detecting passage of at least one position marker provided at the rotor, the at least one position marker extending along an axial direction, from a first end to a second end, and having varying magnetic permeability from the first end to the second end, and processing the at least one sensor signal to generate a feedback signal indicative of the blade pitch angle of the rotor.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
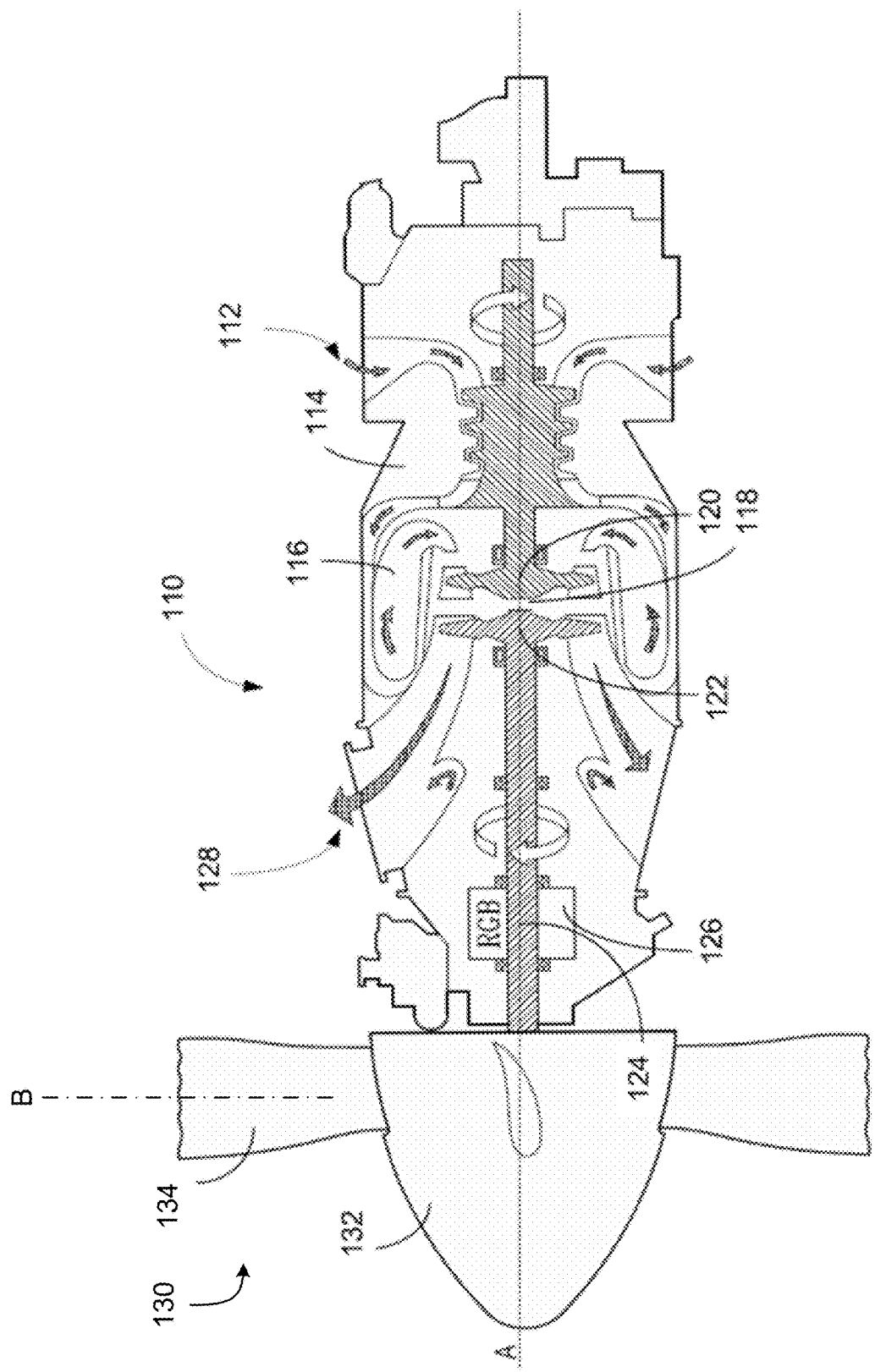
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132.

The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to a hub by any suitable means and extending radially therefrom. The blades 134 are also each rotatable about their own radial axes through a plurality of blade angles, which can be changed to achieve modes of operation, such as feather, full reverse, and forward thrust.

Figure 2:
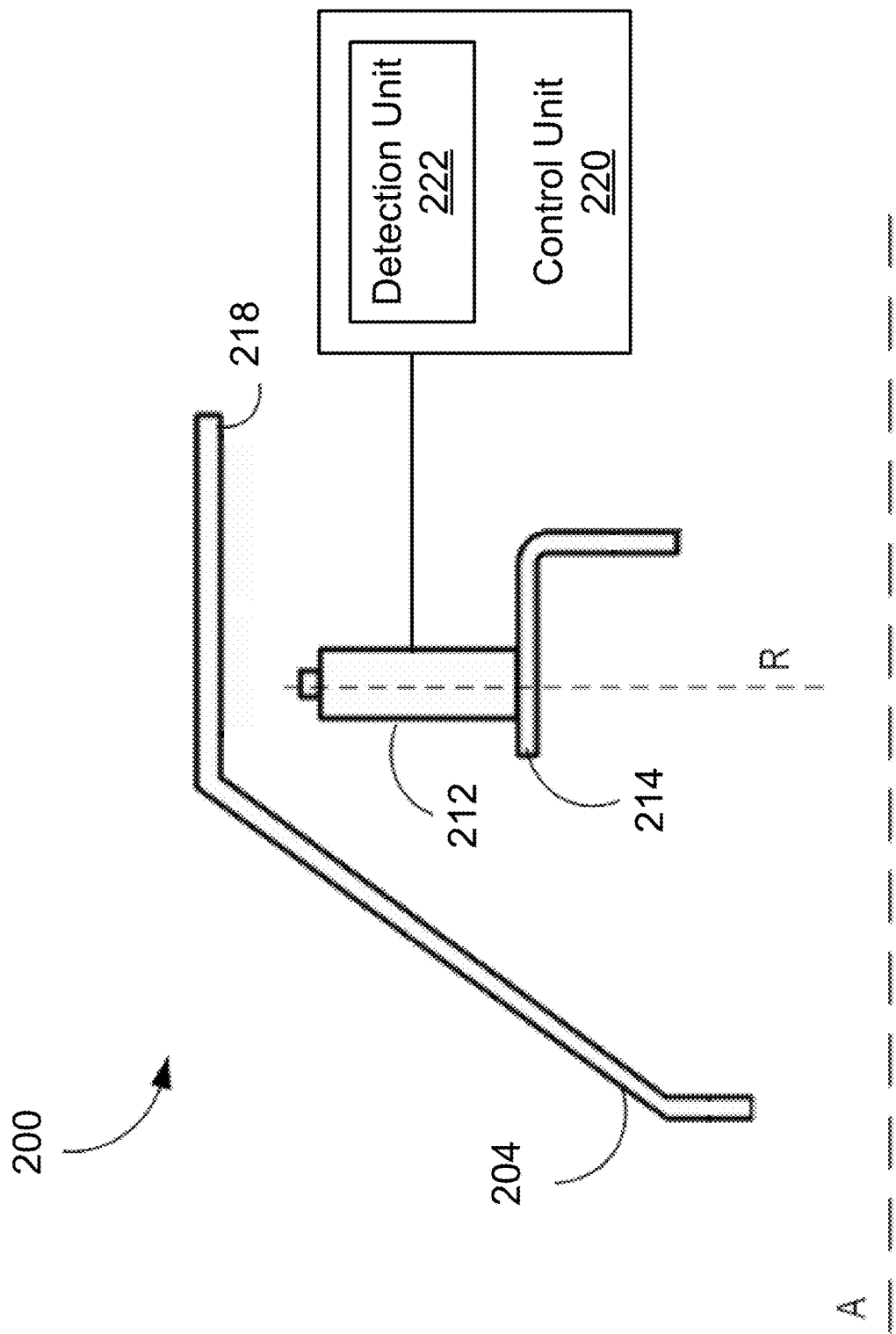
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. As will be described further below, in one embodiment, the feedback device has multiple readable markers disposed on a surface thereof, and a sensor positioned adjacent the feedback device can be used to measure the rotation of the feedback device via the markers, providing a proxy value for the rotational velocity of the engine, as well as measure blade angle. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers, reference 202 in FIG. 4) disposed thereon for detection by sensor(s) 212. In some embodiments, the detectable features 202 and sensor(s) 212 may be disposed on a radially-outer side of feedback device 204. Alternatively, detectable features 202 and sensor(s) 212 could be disposed on a radially-inner side of feedback device 204. Several detectable features 202 may be spaced equiangularly about the perimeter (also referred to herein as the 'circumference') of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis 'A' to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing a sensor signal which is transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. The position markers 202 provided on the feedback device 204 may then be made of any suitable material which would cause the passage of the position markers 202 near the sensor(s) 212 to provide a change in magnetic permeability within the magnetic field generated by the sensor 212. When a position marker 202 is present in the sensing zone, or passes through the sensing zone during rotation of the feedback device 204, the magnetic flux in the sensing zone is varied by the presence of the position marker 202 (in other words, a change in magnetic permeability occurs), and the sensor(s) 212 can produce a signal pulse, which forms part of the sensor signal. It should be understood that the sensor 212 may be any suitable sensor other than an inductive sensor, including, but not limited to, a Hall sensor and a variable reluctance sensor.

In the example illustrated in FIG. 2, a side view of a portion of feedback device 204 and sensor 212 is shown. The sensor 212 is mounted to a flange 214 of a housing of the reduction gearbox 126, so as to be positioned adjacent the plurality of position markers 202, which may extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate. In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided.

Figure 3:
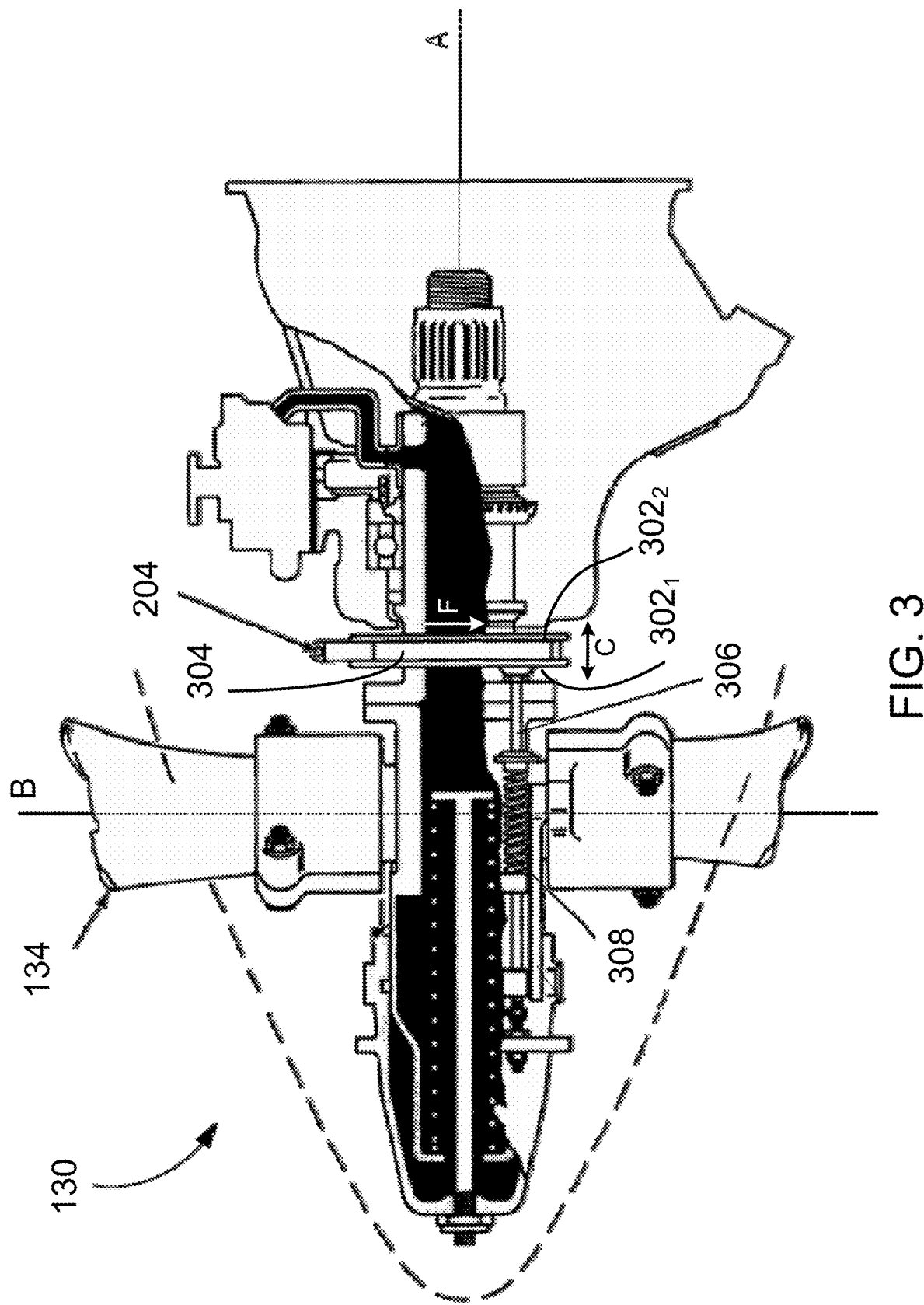
FIG. 3 is a schematic diagram of the propeller of FIG. 1 showing the feedback device of FIG. 2, in accordance with one embodiment.

With additional reference to FIG. 3, in some embodiments the feedback device 204 is embodied as a circular disk which rotates as part of the engine 110, for example with the propeller shaft 124 or with the propeller 130. The feedback device 204 comprises opposing faces (not shown) having outer edges $302_1$, $302_2$ and defines an exposed surface (also referred to as a "root surface") 304 which extends between the opposing faces and circumscribes them. Put differently, the surface 304 of the feedback device 204 is the periphery of the circular disk which spans between the two opposing faces and the root surface 304 intersects the faces at the edges $302_1$, $302_2$. The position markers 202 are illustratively provided on the surface 304 (in a manner that will be discussed in further detail below) and the sensor 212 is configured to be positioned adjacent the surface 304 to detect passage of the position markers 202. As discussed above, in some embodiments, the surface 304 is a radially-outer side of the feedback device 204 whereas in other embodiments, the surface 304 is a radially-inner side of feedback device 204.

The position markers 202 may be manufactured separately from the feedback device 204 and attached thereto using any suitable technique, such as welding or the like. A position marker 202 can then be a portion of the feedback device 204 which is made of a different material, or to which is applied a layer of a different material. The position markers 202 may then be applied to the surface 304, for instance as strips of metal or other material for detection by the sensor 212.

With continued additional reference to FIG. 3, the feedback device 204 is supported for rotation with the propeller 130, which rotates about the longitudinal axis 'A'. The feedback device 204 is also supported for longitudinal sliding movement along the axis A, e.g. by support members, such as a series of circumferentially spaced feedback rods 306 that extend along the axis A. A compression spring 308 surrounds an end portion of each rod 306.

As depicted in FIG. 3, the propeller 130 comprises a plurality of angularly arranged blades 134, each of which is rotatable about a radially-extending axis 'IR' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

Figure 4:
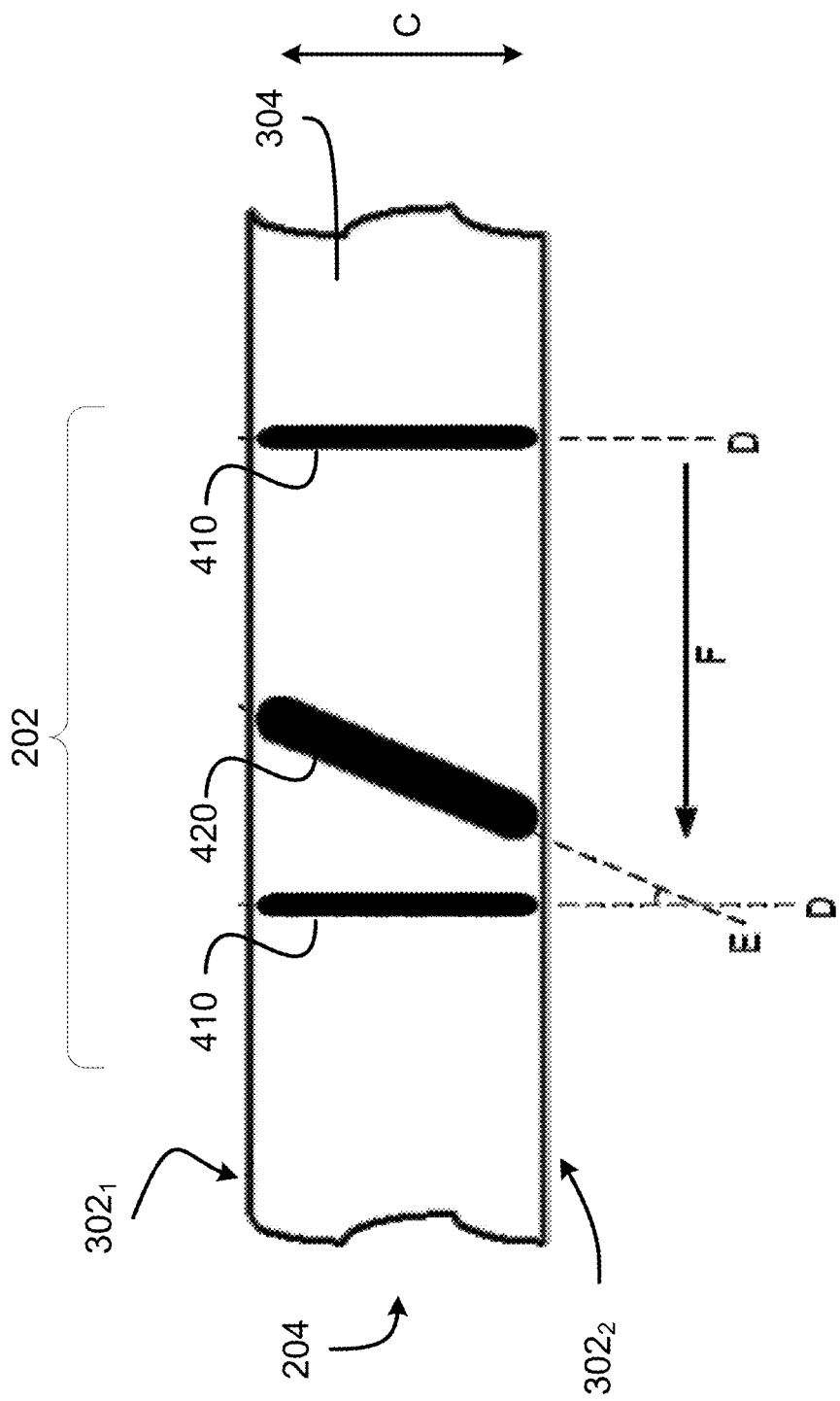
FIG. 4 is a schematic view of a surface of the feedback device of FIG. 2, with position markers provided thereon, in accordance with one embodiment.

Referring now to FIG. 4 in addition to FIG. 2 and FIG. 3, the feedback device 204 illustratively comprises the position markers 202. In one embodiment, the position markers 202 may comprise a plurality of first markers 410 (referred to herein as "straight" markers) arranged along a direction 'ID', which is substantially transverse to the opposing edges $302_1$, $302_2$ (i.e. substantially parallel to the axis A of FIG. 3). Although only two markers 410 are illustrated, it should be understood that any suitable number of markers 410 may be present across the whole of the surface 304. In one embodiment, the markers 410 may be substantially equally spaced from one another on the surface 304. In addition, the markers 410 may, in some embodiments, be of substantially a common shape and size, for example having a common volumetric size. Still, other embodiments are considered.

The position markers 202 may also comprise at least one supplementary (or second) marker 420 (referred to herein as an "angled" or "slanted" marker) which is positioned between two adjacent ones of the first markers 410. Each second marker is illustratively oriented along a direction 'E', which is at an angle relative to the direction 'D' along which the first markers are arranged. The angle between directions 'D' and 'E' can be any suitable value between 1° and 89°, for example 30°, 45°, 60°, or any other value, as appropriate. In some embodiments, the feedback device 204 includes only a single supplementary marker 420. In other embodiments, the feedback device 204 can include more than one (e.g., two, three, four, or more) supplementary marker 420. In embodiments in which the feedback device 204 includes more than one supplementary marker 420, the supplementary markers 420 can all be oriented along a common orientation, for instance direction 'E', or can be oriented along one or more different orientations. The marker 420 can be located at substantially a midpoint between two adjacent markers 410, or, as shown in FIG. 4, can be located close to a particular one of two adjacent markers 410. Other embodiments may apply.

The signal pulses produced by the sensor 212, which form part of the electrical signal received by the control unit 220, can be used to determine various operating parameters of the engine 110 and the propeller 130. In particular, the sensor signal generated by the sensor 212 illustratively comprises a first series of pulses generated in response to detecting the first markers 410 and a second series of pulses generated in response to detecting the second marker(s) 420. The spacing of the first markers 410 (which may, or may not, be regular) can, for example, be used to determine a speed of rotation of the feedback device 204. In addition, the second marker(s) 420 can be detected by the sensor 212 to determine a blade angle of the propeller 130.

With continued reference to FIG. 2, FIG. 3, and FIG. 4, as the feedback device 204 rotates, varying portions thereof enter, pass through, and then exit the sensing zone of the one or more sensors 212. From the perspective of the sensor(s) 212, the feedback device 204 moves axially along axis A (in the direction of arrow 'C') and rotates about direction 'F' (shown in FIG. 4).

In order to improve the reading accuracy of the sensor(s) 212, it is proposed herein to provide a feedback device 204 having one or more position markers 202 with variable magnetic permeability (referred to herein as "variable permeability marker(s)"). For this purpose and as will be discussed in further detail below, the feedback device 204 comprises at least two materials that have different magnetic permeability. The position markers 202 are configured such that their magnetic permeability gradually varies (i.e. gradually increases, gradually decreases, or a combination thereof) along the direction of axial travel of the feedback device 204. The variable magnetic permeability results in a change in magnetic flux density (generated by the passage of the variable permeability marker(s) as the feedback device 204 translates axially along axis A of FIG. 3, in the direction of arrow 'C') and creates a change in the sensor signal amplitude. As the feedback device 204 translates axially, the varying magnetic permeability across the feedback device 204 causes differences in the sensor's output voltage and improves reading accuracy.

Figure 5:
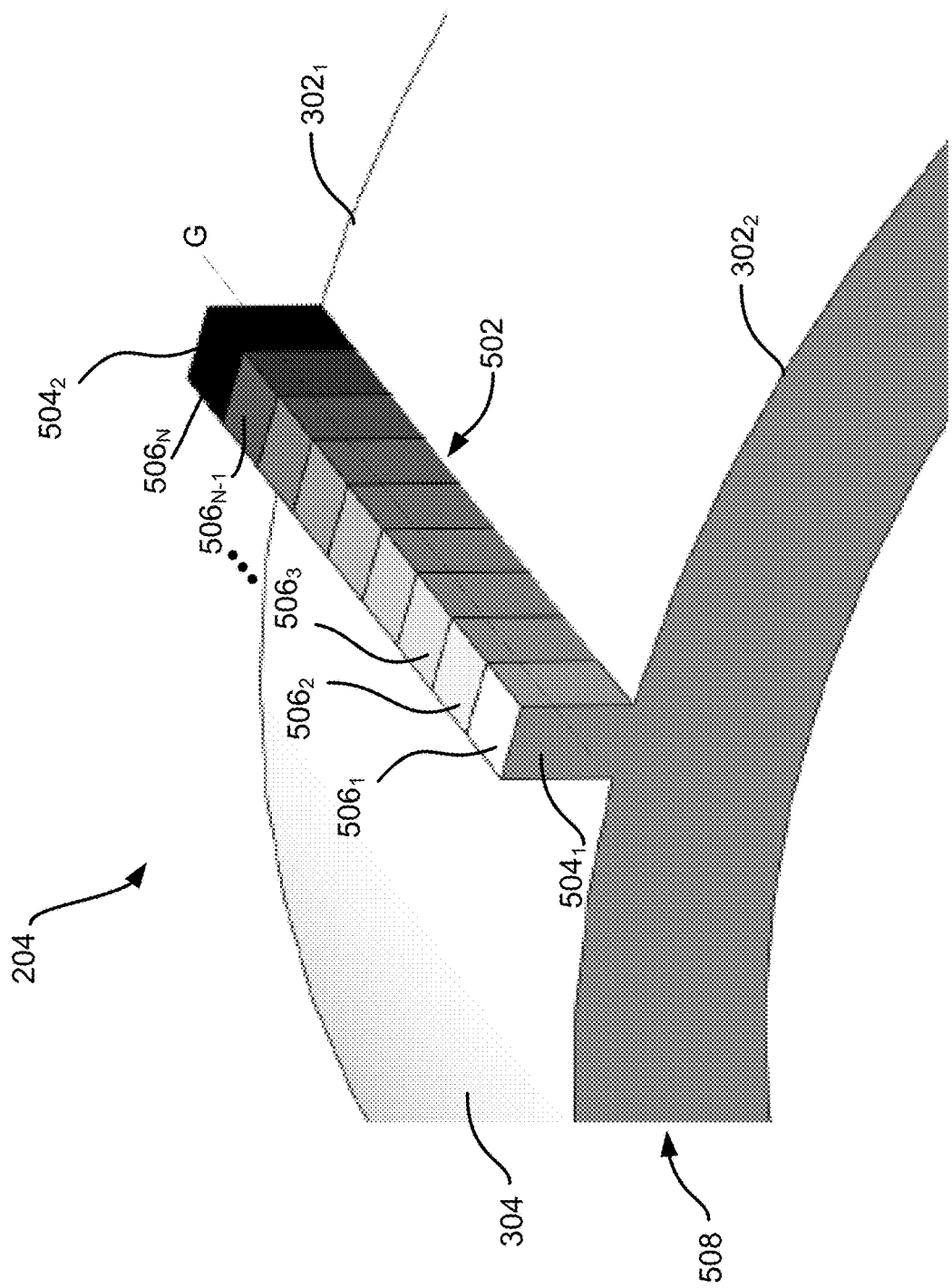
FIG. 5 is a schematic diagram of a feedback device having variable magnetic permeability, in accordance with one embodiment.

Referring now to FIG. 5, a variable permeability marker 502 in accordance with one embodiment will now be described. The variable permeability marker 502 extends along a direction 'G' (referred to herein as an "axial direction"), from a first end (or termination) $504_1$ to a second end $504_2$ opposite the first end $504_1$. In the embodiment shown in FIG. 5, direction 'G' is substantially parallel to the longitudinal axis A of FIG. 3 (i.e. aligned with direction 'E' of FIG. 4). It should however be understood that direction 'G' may be at any suitable angle relative to axis A (e.g., aligned with direction 'D' of FIG. 4). In the embodiment of FIG. 5, the first end $504_1$ is illustratively adjacent a given one of the edges $302_1$, $302_2$ of the feedback device 204 while the second end $504_2$ is adjacent the other one of the edges $302_1$, $302_2$. It should however be understood that the first end $504_1$ and/or the second end $504_2$ may extend beyond the corresponding edge $302_1$, $302_2$. The variable permeability marker 502 comprises a plurality of materials having different magnetic permeability, the materials being selected such that the marker's magnetic permeability increases gradually from the first end $504_1$ to the second end $504_2$, along direction 'G'. Each material defines a corresponding magnetic permeability region, such that the variable permeability marker 502 comprises a number (N) of different magnetic permeability regions $506_1$, $506_2$, ..., $506_{N-1}$, $506_N$, which are axially adjacent to one another (i.e., from the first end $504_1$ to the second end $504_2$) along the direction 'G'.

In the embodiment of FIG. 5, region $506_1$ has the lowest magnetic permeability and is provided adjacent the first end $504_1$, while region $506_N$ has the highest magnetic permeability and is provided adjacent the second end $504_2$. The successive regions $506_2$, ..., $506_{N-1}$ between regions $506_1$ and $506_N$ have gradually increasing magnetic permeability. For example, region $506_2$, which is axially adjacent to region $506_1$, has a magnetic permeability that is higher than that of region $506_1$, but lower than that of region $506_3$. Region $506_3$, which is axially adjacent to region $506_2$, has a magnetic permeability that is higher than that of region $506_2$, but lower than that of the next region (not shown). Region $506_{N-1}$, which is axially adjacent to region $506_N$, has a magnetic permeability that is lower than that of region $506_N$, but higher than that of the preceding axially adjacent region (not shown).

It should however be understood that, although the variable permeability marker 502 is illustrated and described herein as having a magnetic permeability that gradually increases (i.e. changes from low to high) from the first end $504_1$ to the second end $504_2$, a gradual decrease (i.e. a change from high to low) in magnetic permeability from the first end $504_1$ to the second end $504_2$ may also be achieved. For example, the highest magnetic permeability region $506_N$ may be provided adjacent the first end $504_1$, the lowest magnetic permeability region $506_1$ may be provided adjacent the second end $504_2$, and the successive magnetic permeability regions $506_{N-1}$, ..., $506_2$ between the highest and lowest regions $506_1$, $506_N$ may have a gradually decreasing magnetic permeability. Other embodiments may also apply, as will for example be discussed further herein with reference to FIG. 6.

Still referring to FIG. 5, the feedback device 204 may comprise a body (or core) 508, which illustratively includes the surface 304. In one embodiment, the body 508 may be made of a material (referred to herein as a "base substrate material") having a magnetic permeability that is lower than that of the variable permeability marker 502. In other words, the body 508 may define a region (not shown) having a magnetic permeability that is lower than that of the regions $506_1$, $506_2$, ..., $506_{N-1}$, $506_N$. As such, the materials used for the regions $506_1$, $506_2$, ..., $506_{N-1}$, $506_N$ may be referred to herein as "high magnetic permeability materials". It should be understood that, in some embodiments, the body 508 may be made of a base substrate material having a magnetic permeability that is substantially equal to the magnetic permeability of the lowest magnetic permeability region (e.g., region $506_1$) of the variable permeability marker 502. In other words, the body 508 may be made of the same material as region $506_1$. As such, the material used for the body 508 and region $506_1$ may be referred to as a "low magnetic permeability material" and the materials used for the regions $506_2$, ..., $506_{N-1}$, $506_N$ may be referred to herein as "high magnetic permeability materials". Other embodiments may apply.

As used herein, the term "high magnetic permeability material" refers to a material whose magnetic permeability is greater than that of the base substrate material used for the body 508 of the feedback device 204 and/or greater than that of the material used for the lowest magnetic permeability region (e.g., region $506_1$) of the variable permeability marker as in 502, such that the high permeability material increases the sensor signal relative to the base substrate material. Using high magnetic permeability materials for the variable permeability marker 502 may indeed allow to increase the change in magnetic flux generated by the passage of the variable permeability marker 502 in the sensing zone of the sensor (reference 212 in FIG. 2). It should be understood that, as used herein, the term "high magnetic permeability material" does not necessarily denote a particular value for magnetic permeability, nor a particular range of magnetic permeability values. Rather, reference to the high magnetic permeability material (as used, for instance, for a given region of a position marker) is in contrast with the material that makes up other regions of the position marker and/or in contrast with the base substrate material that makes up the body 508 of the feedback device 204.

In one embodiment, the body 508 is made of a metallic or ferromagnetic material (including, but not limited to, steel). In another embodiment, the body 508 is made of a thermoplastic or other non-metallic material. In one embodiment, the high magnetic permeability materials (used for the markers) include, but are not limited to, Mu-metal (which has relative permeability values of 80,000 to 100,000 compared to several thousand for ordinary steel), ferrite ceramics, permalloy, supermalloy, steel, and nickel. It should also be understood that the characteristics (e.g., type and thickness) of the high magnetic permeability materials may be specific to the application, the parameters (e.g. engine configuration) specific to that application, the distance of the sensor(s) 212 relative to the feedback device 204, the geometry of the feedback device 204 (e.g., available space according to clearances and tolerance stackup of the feedback sensing system 200), and any reading error (also referred to as "beta error") experienced by the feedback sensing system 200. In one embodiment, the thickness (e.g., 0.004 inch and up) of the high magnetic permeability materials may be optimized to achieve a desired reading accuracy.

Figure 6:
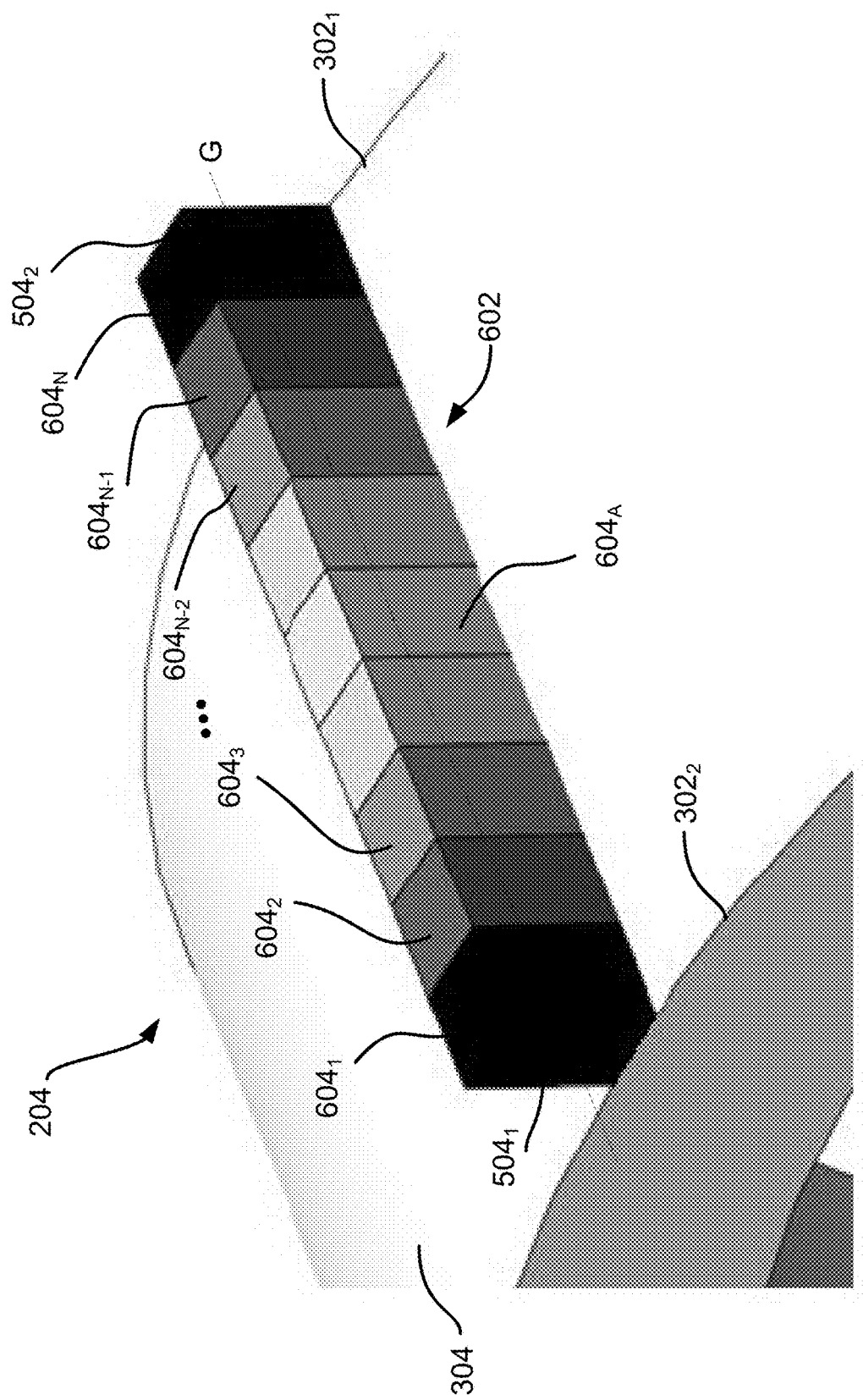
FIG. 6 is a schematic diagram of a feedback device having variable magnetic permeability, in accordance with another embodiment.

Referring now to FIG. 6, a variable permeability marker 602 in accordance with another embodiment will now be described. In the embodiment of FIG. 6, the variable permeability marker 602 is configured to have increasingly higher magnetic permeability towards the edges $302_1$, $302_2$ of the feedback device 204. This in turn may allow to reduce so-called "edge-effects" (and accordingly decrease the beta error near the edges $302_1$, $302_2$) while providing space savings (e.g., by alleviating the need for increasing the thickness of the feedback device 204 axially or for extending markers past the edges $302_1$, $302_2$). With axial travel of the feedback device 204, the one or more sensors (reference 212 in FIG. 2) are indeed positioned adjacent to different portions of the feedback device 204. In particular, a given sensor 212 is adjacent the edge $302_2$ (also referred to as the 'engine side') when the propeller (reference 130 in FIG. 1) is in a primary blade angle (or fine pitch) position. When the propeller 130 is in the maximum reverse condition, the sensor 212 is adjacent the edge $302_1$ (also referred to as the 'propeller side'). The longitudinal (or beta) position (along axis A) of the feedback device 204 relative to the sensor 212 therefore varies with movement of the feedback ring 204. However, as the sensor 212 is positioned adjacent to the edges $302_1$, $302_2$ with movement of the feedback ring 204, a drop in magnetic flux occurs. This results in a so-called "edge-effect" that leads to an increase in beta error at the edges $302_1$, $302_2$, particularly as the feedback device 204 moves away from the sensor 212.

In order to permit the sensor(s) 212 to accurately detect the passage of the variable permeability marker 602 without any edge-related effects, or at least with reduced edge-related effects, the variable permeability marker 602 comprises different magnetic permeability regions $604_1$, $604_2$, ..., $604_{N-1}$, $604_N$, which are axially adjacent to one another (i.e., from the first end $504_1$ of the variable permeability marker 602 to the second end $504_2$) along the direction 'G', the regions $604_1$, $604_N$ with the highest magnetic permeability being provided adjacent the ends $504_1$, $504_2$. Starting from each end $504_1$, $504_2$, the magnetic permeability gradually decreases until it reaches its lowest value at a given transition point between the first end $504_1$ and the second end $504_2$. In other words, the magnetic permeability region $604_A$ (referred to herein as a "transition region"), which is provided at the transition point (i.e. between the first end $504_1$ and the second end $504_2$ and accordingly between the high magnetic permeability regions $604_1$ and $604_N$), has the lowest magnetic permeability.

It should be understood that, while the transition point (and accordingly the transition region $604_A$) is illustrated in FIG. 6 as being substantially mid-way between the first end $504_1$ and the second end $504_2$, this may not be the case for all embodiments. The location of the transition point (and accordingly the transition region $604_A$) along the axial direction 'G' may be correlated to the location where the feedback device 204 transitions from the fine pitch condition to the reverse condition when translating along the axis A. As such, the location of the transition point (and accordingly of the transition region $604_A$) may depend on factors including, but not limited to, engine configuration, tolerance stackup, and amount of axial travel of the feedback device 204.

In addition, although FIG. 6 illustrates the same number of magnetic permeability regions $604_1$, $604_2$, ..., $604_{N-1}$, $604_N$ on either side of the transition region $604_A$, it should be understood that this may not be the case in all embodiments. In embodiments where no change in the geometry (e.g., height) of the variable permeability marker as in 602 is implemented, it may be desirable to vary the magnetic permeability differently on either side of the transition point or region $604_A$ (which may in this case not be substantially mid-way between the first end $504_1$ and the second end $504_2$). This may allow the feedback system (reference 200 in FIG. 2) to more accurately determine the axial position of the feedback device 204. In particular, by using different magnetic permeability changes (e.g., different increments/decrements or different material thicknesses) on either side of the transition region, it becomes possible (by correlating the magnetic permeability increment/decrement to the axial position) to accurately determine whether the feedback device 204 is moving towards the engine side or the propeller side.

In yet another embodiment (not illustrated), the variable permeability marker 602 may be configured to have higher magnetic permeability at a transition region (located between the edges $302_1$, $302_2$ of the feedback device 204) and decreasingly lower magnetic permeability towards the edges $302_1$, $302_2$. The body of the feedback device 204 may in this case be made of the same material as the marker's low magnetic permeability regions provided adjacent the edges $302_1$, $302_2$. This embodiment may apply where the feedback system 200 comprises two sensors (reference 212 in FIG. 2).

Figure 7A:
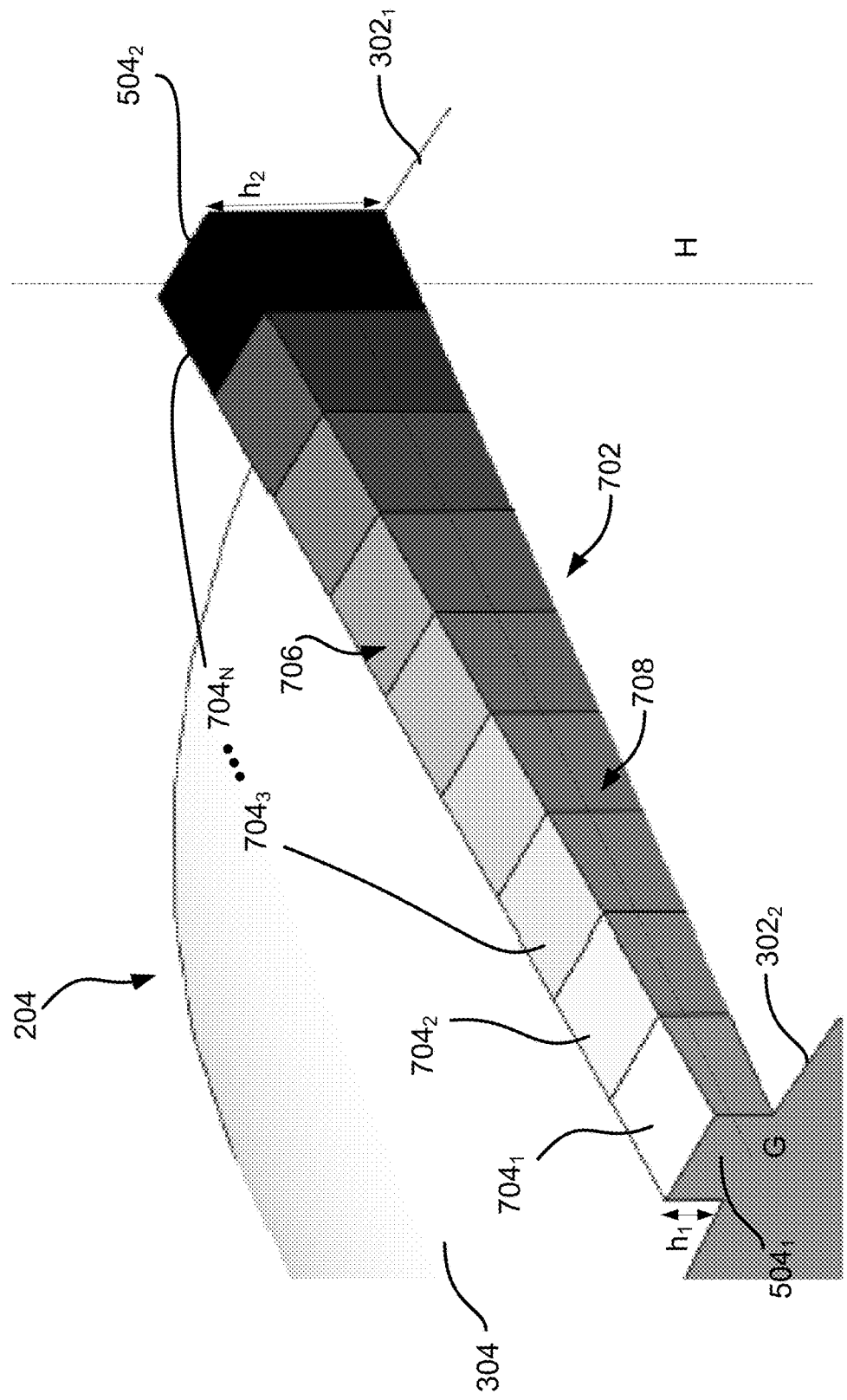
FIG. 7A is a schematic diagram of a feedback device having variable magnetic permeability, in accordance with another embodiment.

Referring now to FIG. 7A, a variable permeability marker 702 in accordance with another embodiment will now be described. Similarly to the variable permeability markers (references 502, 602) described above with reference to FIG. 5 and FIG. 6, the variable permeability marker 702 comprises different magnetic permeability regions $704_1$, $704_2$, $704_3$, ..., $704_N$, which are axially adjacent to one another (i.e., from the first end $504_1$ of the marker 702 to the second end $504_2$) along the direction 'G'. The geometry of the variable permeability marker 702 is also modified along a direction H, which is transverse to the direction of axial translation of the feedback device 204 (e.g., transverse to the direction 'G'). In this manner, the variable permeability marker 702 has a dimension (also referred to herein as a "height", i.e. the distance between the upper surface 706 of the marker 702 and the root surface 304) along the direction 'H' that varies gradually. For example, the variable permeability marker 702 has a first height $h_1$ at the first end $504_1$ and a second height $h_2$ at the second end $504_2$, with $h_2$ being greater than $h_1$. The marker's height increases gradually (while its magnetic permeability also increases gradually) from the first end $504_1$ to the second end $504_2$, such that the upper surface 706 of the variable permeability marker 702 is sloped, i.e. at an angle relative to the bottom surface (not shown) of the variable permeability marker 702.

The geometry of the variable permeability marker 702 may be modified along the direction 'H' to achieve a gradual change in the amplitude of the sensor signal generated upon the sensor (reference 212 in FIG. 2) detecting passage of the variable permeability marker 702, and accordingly achieve a desired reading accuracy. As such, it should be understood that other variations of geometry may apply. For example, the variable permeability marker 702 may be configured such that its height decreases gradually (while its magnetic permeability increases gradually) from the first end $504_1$ to the second end $504_2$. In other words, a higher permeability material may be used (i.e. the highest permeability region $704_N$ may be provided) where the height of the variable permeability marker 702 is the lowest. As a result, the sensor signal may be increased at the smallest portion of the variable permeability marker 702, i.e. where the total air gap is larger due to the marker 702 being further away from the sensor 212. Since maintaining the air gap affects magnetic flux density and signal quality, the proposed configuration of the feedback device 204 may thus improve the reading accuracy of the overall feedback sensing system 200. In addition, although FIG. 7A illustrates the geometry of the variable permeability marker 702 as varying linearly, it should be understood that this may not necessarily be the case.

Figure 7B:
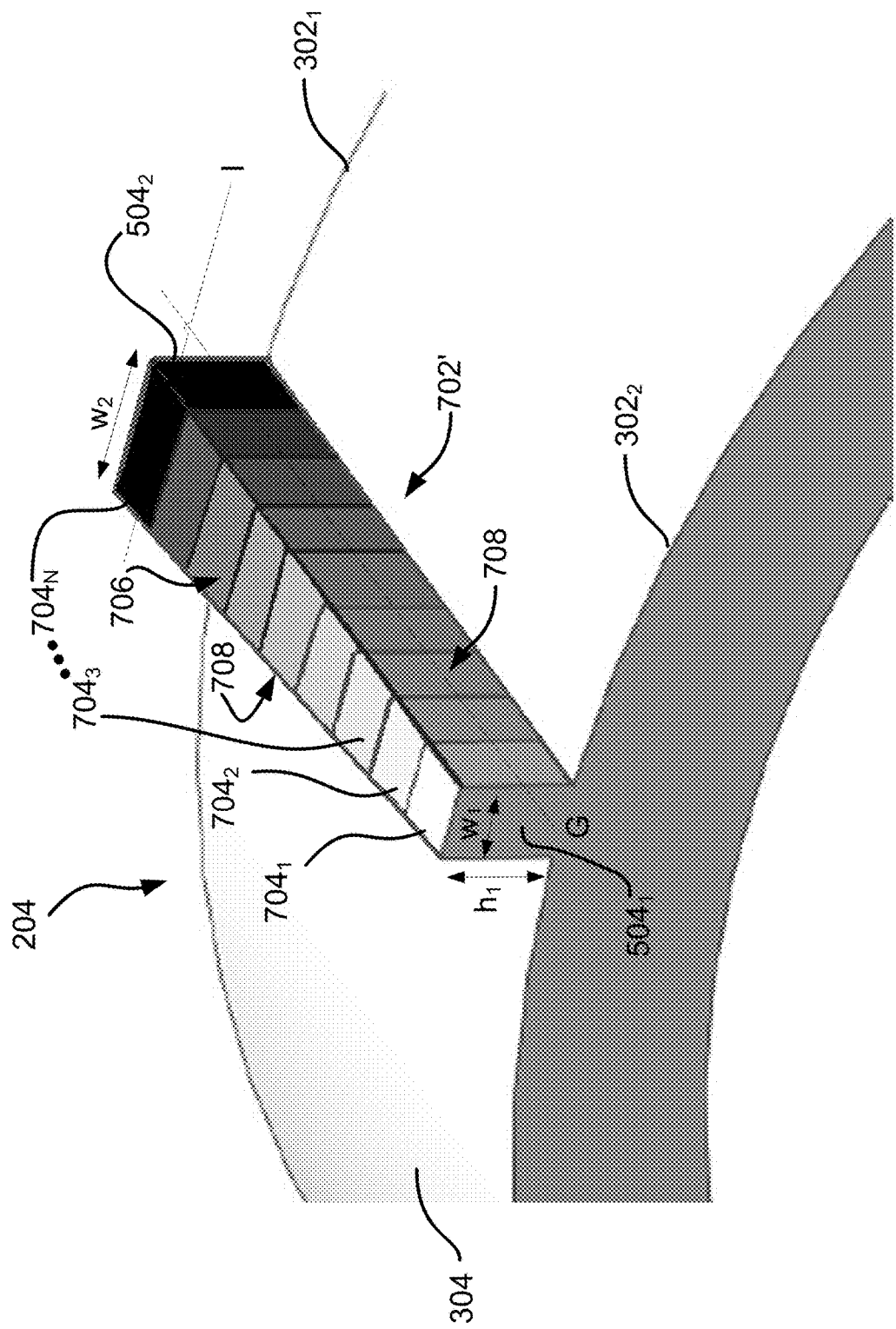
FIG. 7B is a schematic diagram of a feedback device having variable magnetic permeability, in accordance with yet another embodiment.

It should also be understood that, in addition to or as an alternative to modifying the geometry of the upper surface 706, the geometry of one or both side surfaces 708 of the variable permeability marker 702 may be modified. Modifying the geometry of any of the side surfaces 708 while maintaining the geometry of the upper surface 706 (i.e. the height $h_1$ of the marker 702) substantially constant may allow to maintain the air gap and accordingly improve the sensor signal. As illustrated in FIG. 7B, the dimension (referred to herein as the "width" or thickness) of the marker 702 along a direction 'I' substantially perpendicular to direction 'G' may be varied. FIG. 7B indeed shows a variable permeability marker 702' having a height $h_1$ that remains substantially constant (or equal) along the axial direction 'G' (i.e. from the first end 504$_1$ to the second end 504$_2$). The side surfaces 708 of the variable permeability marker 702' are sloped, such that the variable permeability marker 702' width increases gradually (while its magnetic permeability also increases gradually) from the first end 504$_1$ to the second end 504$_2$. In other words, the marker 702' has a first width $w_1$ at the first end 504$_1$ and a second width $w_2$ at the second end 504$_2$, with $w_2$ being greater than $w_1$. It should be understood that, although FIG. 7B illustrates an embodiment where both side surfaces 708 of the variable permeability marker 702' are modified, only one of the side surfaces 708 may be modified. It should also be understood that the change (e.g., increment) in the marker's width may be limited by the length (e.g., the dimension along the axial axis A) of the feedback device 204. It may also be desirable for the change in the marker's width to be such that, at no point along the axial direction, does the marker's width exceed the width (or thickness) of the head (not shown) of sensor 212. In this manner, accuracy of the feedback system 200 can be ensured.

Figure 8:
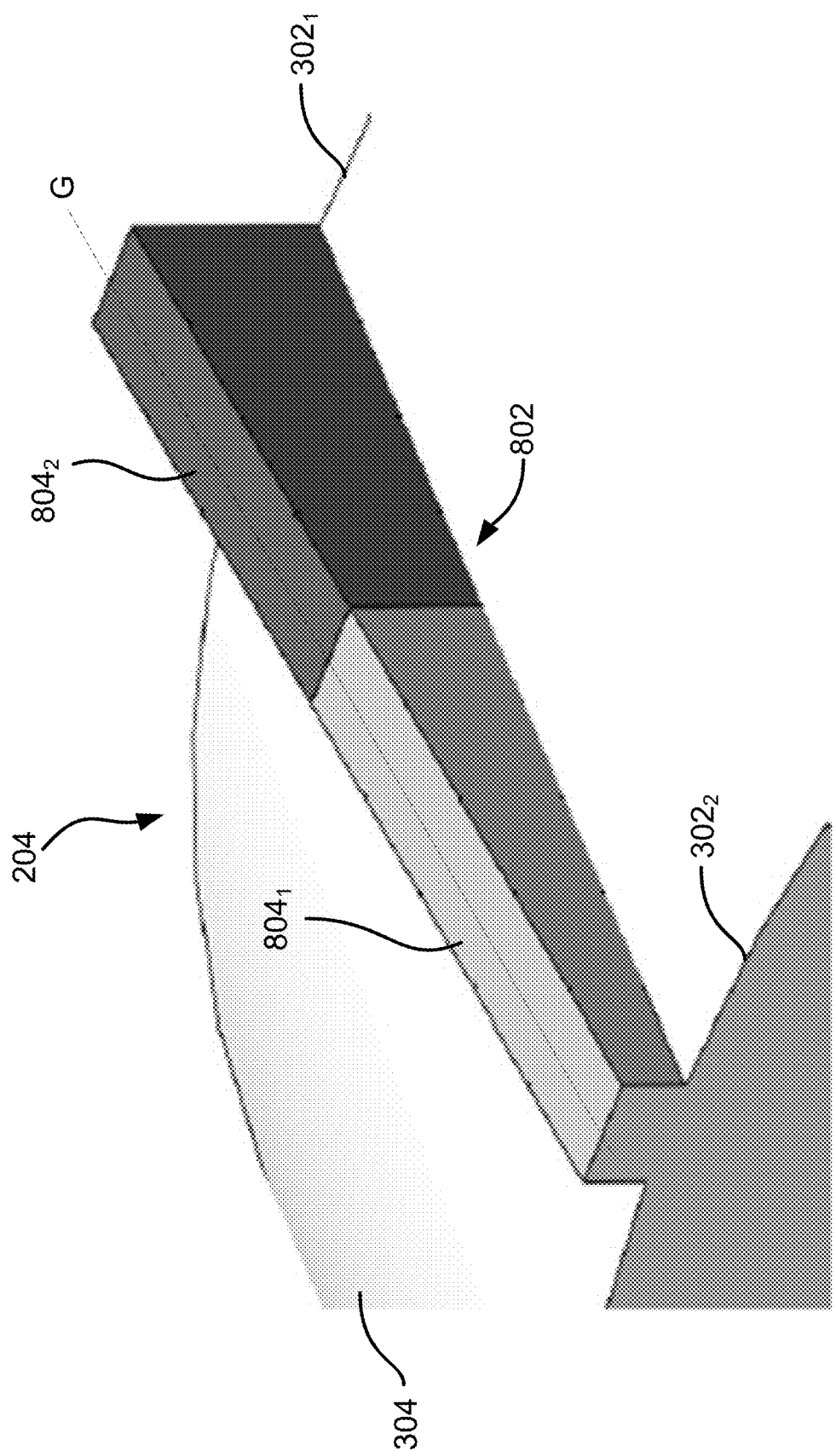
FIG. 8 is a schematic diagram of a feedback device having variable magnetic permeability, in accordance with another embodiment.

Referring now to FIG. 8, in one embodiment, the feedback device 204 may have different material magnetic permeability for reverse and low pitch situations. In particular, the magnetic permeability in the reverse condition may be higher than that in the fine (or lower) pitch condition, and vice versa. This may be achieved by providing a variable permeability marker 802 comprising a first material having a first magnetic permeability and a second material having a second magnetic permeability higher than the first magnetic permeability. A first portion (also referred to as a "fine pitch region", not shown) of the variable permeability marker 802, namely the portion of the marker 802 that is closest to the edge 302$_2$ or engine side, may be provided with the first material so as to define a first (lower) magnetic permeability region 804$_1$. A second portion (also referred to as a "reverse region", not shown) of the variable permeability marker 802, namely the portion of the marker 802 that is closest to the edge 302$_1$ or propeller side, may be provided with the second material so as to define a second (higher) magnetic permeability region 804$_2$ which has a higher magnetic permeability than that of the first magnetic permeability region 804$_1$. In the embodiment of FIG. 8 in which the variable permeability marker 802 comprises two materials of different magnetic permeability, the variable permeability marker 802 also has a gradually increasing height, as discussed above with reference to FIG. 7A, that allows to accurately determine (based on the change in geometry) whether the feedback device 204 is moving towards the engine side or the propeller side.

Figure 9:
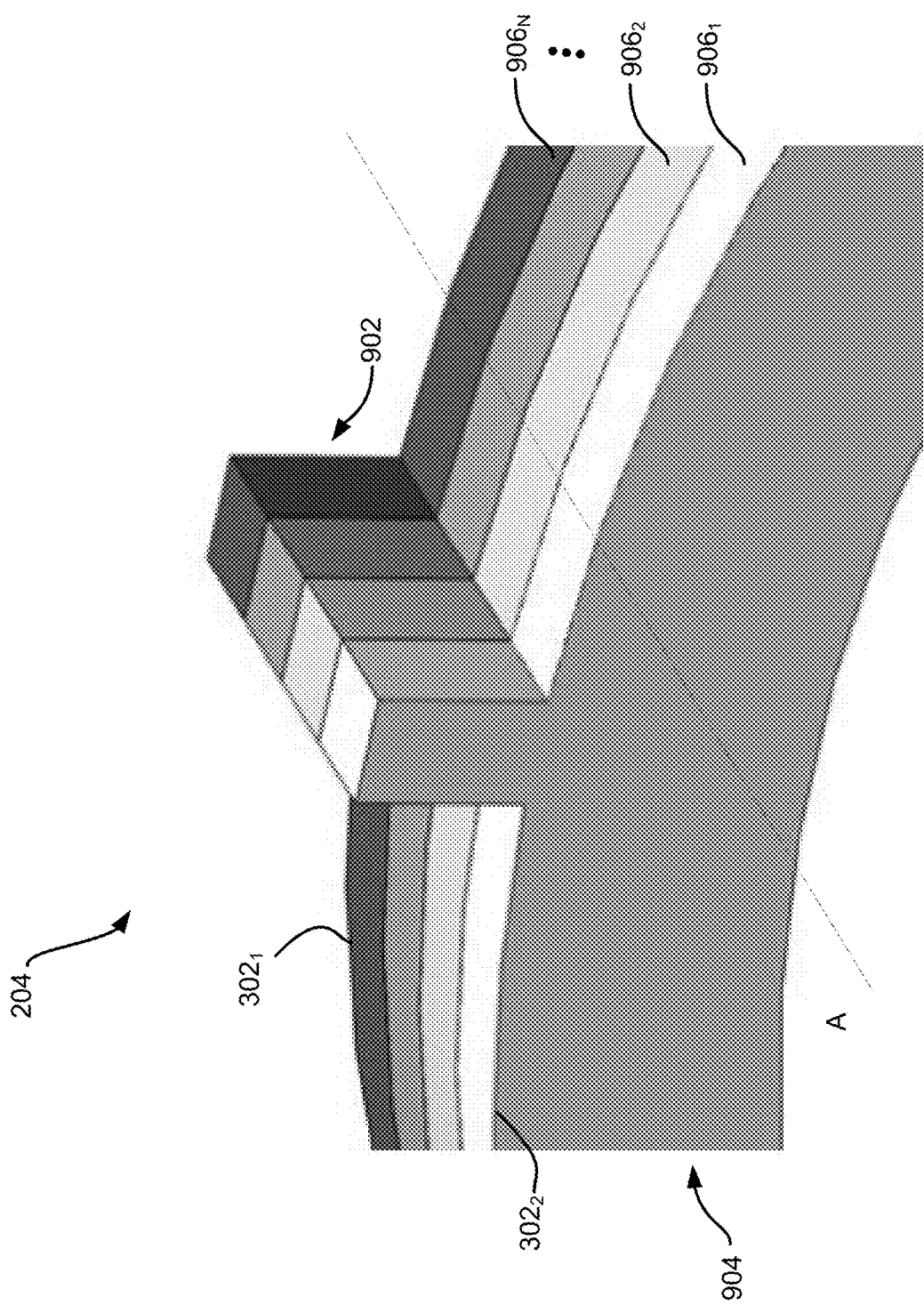
FIG. 9 is a schematic diagram of a feedback device having variable magnetic permeability, in accordance with yet another embodiment.

Referring now to FIG. 9, an alternative embodiment in which the entire feedback device 204 (comprising a variable position marker 902 and a body 904) has varying magnetic permeability will now be described. In this embodiment, the entire feedback device 204 is made of a plurality of materials such that both the variable position marker 902 and the body 904 comprise different magnetic permeability regions 906$_1$, 906$_2$, ..., 906$_N$, which are axially adjacent to one another along the direction of axial travel of the feedback device 204 (i.e. along direction A). In this embodiment, each magnetic permeability region 906$_1$, 906$_2$, ..., 906$_N$ spans a portion of the variable position marker 902 and a portion of the body 904, rather than only spanning a portion of the variable position marker 902.

Although a single variable permeability marker that extends along the direction 'G' is described and illustrated herein, it should be understood that any suitable number of variable permeability markers may be provided on the feedback device 204, that the variable permeability markers may be straight and/or slanted markers, and that the variable permeability markers may have any suitable configuration, shape, size, and orientation. In one embodiment, all position markers 202 (i.e. both straight markers 410 and angled markers 420) may be configured to have variable magnetic permeability. It should however be understood that, in other embodiments, only selected position markers 202 may have variable magnetic permeability. For example, all position markers 202 may be configured to have variable magnetic permeability, except for an index marker (e.g., made of a solid material) used for speed sensing. Other embodiments may apply. It should also be understood that the number of variable permeability markers that are provided on the feedback device 204 may depend on factors including, but not limited to, engine and/or feedback device configuration and required accuracy for the feedback sensing system 200. Indeed, providing an increased number of variable permeability markers may allow to increase the strength (i.e. the amplitude) of the sensor signal, and accordingly improve accuracy.

In addition, although all variable permeability markers have been illustrated and described herein as having the same number (N) of magnetic permeability regions, it should be understood that the number (i.e. the scale) of magnetic permeability regions provided on any given variable permeability marker (and accordingly the increment or decrement from one magnetic permeability region to the other) as well as the thickness of the magnetic permeability materials may vary depending on engine and/or feedback device configuration. The change (i.e. increment and/or decrement) in magnetic permeability may be linear or non-linear from one magnetic permeability region to the other. Geometry changes (as described above with reference to FIG. 7A and FIG. 7B for instance) may be implemented to linearize changes in magnetic permeability. The geometry changes may also be linear (e.g., a linear change in height or width, as illustrated and described with reference to FIG. 7A and FIG. 7B) or non-linear. In addition, although the variable permeability markers have been illustrated and described herein as extending from the root surface 304 of the feedback device 204, it should be understood that, in some embodiments, each variable permeability marker can be a groove, slot, void, inward projection, and the like, as may be appropriate to each particular application and embodiment of the feedback sensing system 200.

The variable magnetic permeability marker(s) described herein may be provided using any suitable process including, but not limited to, additive manufacturing, lamination stack, adhesion, welding, soldering, brazing, casting, forging, extrusion, powder metallurgy, blanking, broaching, milling, grinding, and plating. For example, additive manufacturing may be used to print different layers of materials with varying permeability on top of each other to form the feedback device 204. The feedback device 204 may alternatively contain thin stacked laminations of different permeability materials, which may be joined together. Another technique may consist of attaching the variable magnetic permeability marker(s) to the feedback device 204 via a hub using a dovetail configuration or a firtree configuration, similar to fan blades of a gas turbine engine. The feedback device 204 may alternatively be welded to join the variable permeability materials together. Joining and/or adhesion may be used to secure the materials together, particularly for dissimilar materials that cannot be welded.

Figure 10:
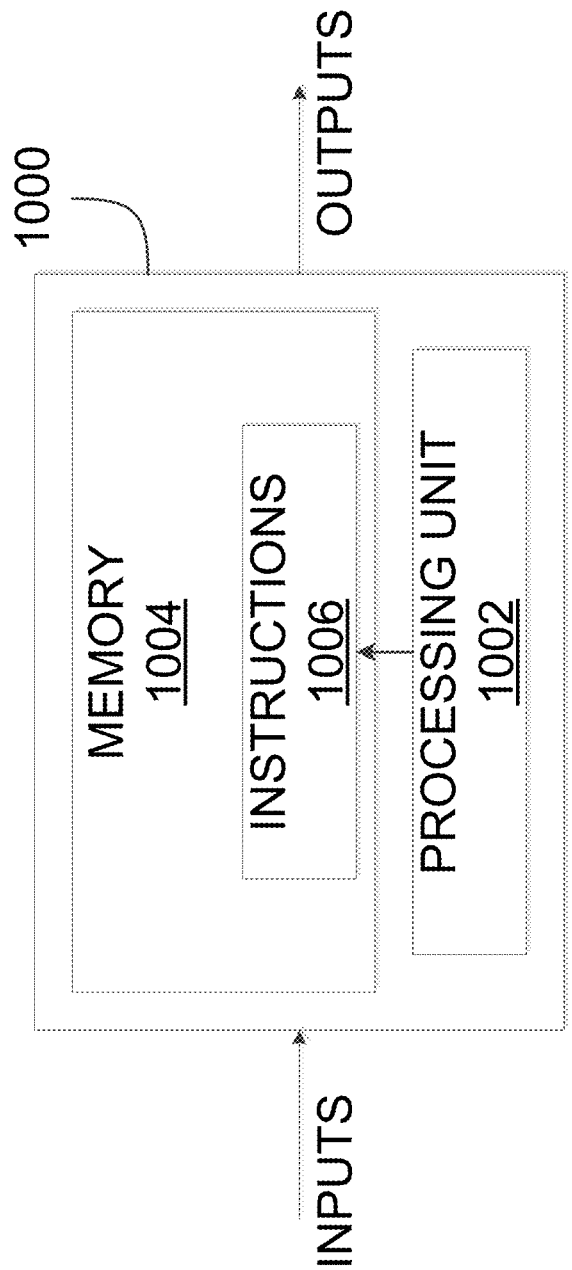
FIG. 10 is a block diagram of an example computing system for implementing the control unit of FIG. 2, in accordance with an embodiment.

FIG. 10 is an example embodiment of a computing device 1000 for implementing the control unit 220 described above with reference to FIG. 2. The computing device 1000 comprises a processing unit 1002 and a memory 1004 which has stored therein computer-executable instructions 1006. The processing unit 1002 may comprise any suitable devices configured to cause a series of steps to be performed such that instructions 1006, when executed by the computing device 1000 or other programmable apparatus, may cause the functions/acts/steps specified in the method described herein to be executed. The processing unit 1002 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 1004 may comprise any suitable known or other machine-readable storage medium. The memory 1004 may comprise non-transitory computer readable storage medium, for example, but not limited to, an electronic, magnetic, optical, electromagnetic, infrared, or semiconductor system, apparatus, or device, or any suitable combination of the foregoing. The memory 1004 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 1004 may comprise any storage means (e.g., devices) suitable for retrievably storing machine-readable instructions 1006 executable by processing unit 1002.

The methods and systems described herein may be implemented in a high level procedural or object oriented programming or scripting language, or a combination thereof, to communicate with or assist in the operation of a computer system, for example the computing device 1000. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 1002 of the computing device 1000, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback system for an aircraft-bladed rotor, the rotor rotatable about a longitudinal axis and having an adjustable blade pitch angle, the system comprising:
   at least one position marker extending along an axial direction relative to the longitudinal axis, from a first end to a second end, and having a varying magnetic permeability from the first end to the second end;
   at least one sensor configured for producing at least one sensor signal in response to detecting a relative movement between the at least one position marker and the at least one sensor, as one of the at least one position marker and the at least one sensor is displaced along the axial direction in response to an adjustment of the blade pitch angle; and
   a control unit communicatively coupled to the at least one sensor and configured to generate a feedback signal indicative of the blade pitch angle in response to the at least one sensor signal received from the at least one sensor.

2. The feedback system of claim 1, wherein the at least one position marker is provided on a feedback device coupled to rotate with the rotor and to move along the axial direction with adjustment of the blade pitch angle, and further wherein the at least one sensor is positioned adjacent the feedback device and configured for producing, as the feedback device rotates about the longitudinal axis, the at least one sensor signal in response to detecting passage of the at least one position marker.

3. The feedback system of claim 2, wherein the at least one position marker comprises a first material having a first magnetic permeability and defining a first magnetic permeability region, and at least one second material having at least one second magnetic permeability and defining at least one second magnetic permeability region adjacent to the first magnetic permeability region along the axial direction.

4. The feedback system of claim 3, wherein the feedback device comprises a body provided with the at least one position marker, the body made of a third material having a third magnetic permeability substantially equal to or lower than the first magnetic permeability and lower than the at least one second magnetic permeability.

5. The feedback system of claim 3, wherein the at least one second material is a second material having greater magnetic permeability than the first material, and further wherein a fine pitch region of the at least one position marker is provided with the first material and a reverse region of the at least one position marker is provided with the second material.

6. The feedback system of claim 3, wherein the at least one second magnetic permeability region comprises a plurality of second magnetic permeability regions axially adjacent to one another along the axial direction and having varying magnetic permeability.

7. The feedback system of claim 6, wherein the first magnetic permeability region is defined at the first end of the at least one position marker, and further wherein the at least one second magnetic permeability is greater than the first magnetic permeability and the plurality of second magnetic permeability regions have increasing magnetic permeability from the first end to the second end.

8. The feedback system of claim 6, wherein the first magnetic permeability region is defined at the first end of the at least one position marker, and further wherein the at least one second magnetic permeability is lower than the first magnetic permeability and the plurality of second magnetic permeability regions have decreasing magnetic permeability from the first end to the second end.

9. The feedback system of claim 6, wherein the first magnetic permeability region is defined between the first end and the second end of the at least one position marker, and further wherein the at least one second magnetic permeability is greater than the first magnetic permeability and the plurality of second magnetic permeability regions have increasing magnetic permeability towards the first end and the second end.

10. The feedback system of claim 3, wherein the feedback device comprises a body provided with the at least one position marker, the body comprising the first material and the at least one second material, and the first magnetic permeability region and the at least one second magnetic permeability region each comprising a portion of the body and of the at least one position marker.

11. The feedback system of claim 2, wherein the at least one sensor is configured for outputting the sensor signal as a function of a position of the feedback device relative to the axial direction.

12. A method for providing feedback for an aircraft-bladed rotor, the rotor rotatable about a longitudinal axis and having an adjustable blade pitch angle, the method comprising:
receiving at least one sensor signal from at least one sensor, the at least one sensor signal produced by the at least one sensor in response to detecting a relative movement between at least one position marker and the at least one sensor, as one of the at least one position marker and the at least one sensor is displaced along the axial direction in response to an adjustment of the blade pitch angle, the of at least one position marker extending along an axial direction relative to the longitudinal axis, from a first end to a second end, and having a varying magnetic permeability from the first end to the second end; and
processing the at least one sensor signal to generate a feedback signal indicative of the blade pitch angle of the rotor.

* * * * *